United States Patent [19]

Thorpe

[11] 3,758,640
[45] Sept. 11, 1973

[54] POLYMER COMPOSITION COMPRISING VINYLMONOMER-BUTADIENE POLYMER GRAFT COPOLYMER AND A POLYESTER

[75] Inventor: Donald H. Thorpe, Williamsville, N.Y.

[73] Assignee: Hooker Chemical Corporation, Niagara Falls, N.Y.

[22] Filed: July 20, 1970

[21] Appl. No.: 56,675

Related U.S. Application Data

[63] Continuation-in-part of Ser. No. 775,161, Nov. 12, 1968.

[52] U.S. Cl............. 260/873, 260/45.7 P, 260/880
[51] Int. Cl.............................................. C08g 39/10
[58] Field of Search............... 260/873, 880, 45.7 P, 260/879

[56] References Cited
UNITED STATES PATENTS 3,577,478   5/1971   Thorpe .............................. 260/873
3,577,480   5/1971   Thorpe .............................. 260/873

*Primary Examiner*—William H. Short
*Assistant Examiner*—Edward Woodberry
*Attorney*—Peter F. Casella, Donald C. Studley, Richard P. Mueller and James F. Mudd

[57] ABSTRACT

Polymers are produced by reacting a polymerizable monomer having aliphatic carbon-to-carbon unsaturation and a polymer of butadiene in an emulsion-suspension polymerization system. The polymers can be blended with another polymer of butadiene such as a polymer of a polymerizable monomer and polybutadiene to produce useful products or used alone to produce molded articles, laminates, extruded products, protective coatings and the like having superior tensile strength together with high impact strength. Blends with halogen containing polyesters and phosphorous containing polyesters or other materials are particularly useful in producing fire retardant polymers.

4 Claims, No Drawings

POLYMER COMPOSITION COMPRISING VINYLMONOMER-BUTADIENE POLYMER GRAFT COPOLYMER AND A POLYESTER

REFERENCE TO PRIOR APPLICATIONS

This is a continuation-in-part of copending application Ser. No. 775,161, filed Nov. 12, 1968 now U.S. Pat. 3,577,478 and Ser. No. 544,817, filed Apr. 25, 1966, now abandoned.

BACKGROUND OF THE INVENTION

1. Field of Invention

This invention relates to novel polymer compositions and to processes for producing them. More particularly, the invention relates to novel polymers having unexpectedly high impact strength in combination with high tensile strength produced by an emulsion-suspension polymerization method.

Industry is constantly in search of new and improved polymer compositions suitable for producing molded articles, laminates, extruded products, protective coatings, and the like. It is the objective of this invention to provide such polymer compositions that have many improved properties, such as higher impact strength, without reduction in tensile strength or heat distortion point.

2. Description of the Prior Art

Graft copolymers of conjugated diolefin polymer latex or a conjugated diolefin-vinyl aromatic hydrocarbon copolymer latex with a mixture of a vinyl aromatic hydrocarbon or an alkyl aryl vinylidene and vinyl cyanide or a vinyl cyanide type compound are known. Graft copolymers of polybutadiene latex with a mixture of styrene and acrylonitrile and graft copolymers of butadiene styrene copolymer latex with a mixture of styrene and acrylonitrile are specific examples of such graft copolymers. These copolymers are solid thermoplastic materials of high commercial utility which are hard and tough materials of good impact strength eminantly suited for use in the production of structural shapes such as pipe, luggage, radio cabinets, automobile instruments panels, etc.

The graft copolymers are prepared by any of the well known conventional polymerization methods such as emulsion polymerization, solution polymerization, bulk or oil phase polymerization and bead or suspension polymerization. These methods require no detailed description here, being well known in the art. Emulsion polymerization methods have generally been preferred in the prior art. Suspension polymerization methods are also used and these are generally understood to result when a mixture of water and finely divided liquid droplets of polymerizable material suspended therein by agitation and to which has been added certain surface active materials in order to disperse the polymerizable material at the beginning of the process and maintain the polymer particles separated during the following polymerization particularly through any sticky intermediate phases. Upon the conclusion of the polymerization a suspension of polymer beads is obtained which can be separated by decantation or centrifugation of the polymers are heavier than water; or by other well known separation processes such as filtration if the beads are lighter than water. This is in contrast to emulsion polymerization methods in which a more or less stable latex is formed that must be broken by coagulation or creaming before the polymer can be separated.

Many grades of graft copolymers of the prior art as referred to above exhibit a high degree of environmental stability suggesting their employment in the fabrication of various structural shapes such as rigid sheets, moldings, pipe, valves, fittings and the like. Often such polymers of the prior art are possessed of low impact strength making it necessary to avoid during fabrication sharp directional transitions in restricting the permissible methods in fields of utilization of rigid shaped articles made therefrom. Thus, the articles must not be subjected to vibration, shock or impact loads during use. In order to obtain higher impact strength values, it is often necessary to sacrifice tensile strength properties in the polymers of the prior art so that such articles are preferably restricted in their use for applications where they may be subjected to internal pressures during use such as frequently occurs in situations involving pipe, valves, fittings and the like.

Finally, polymers of the prior art in order to obtain improved impact and tensile strength are often characterized by having a low heat distortion point and are thus more or less deficient in dimensional stability, particularly at somewhat elevated temperatures resulting in a much narrower permissible range of temperature for the employment of the shaped articles than may be desirable.

SUMMARY OF THE INVENTION

This invention relates to copolymers of a polymerizable compound containing aliphatic carbon-to-carbon unsaturation with a polymer of butadiene, particularly a polybutadiene. The invention further relates to blends or mixtures of such copolymers with a polyester of a polycarboxylic compound and a polyhydric alcohol. The polyester generally contains a maximum of five mole percent of polycarboxylic compound or polyhydric alcohol, or both, that contains aliphatic carbon-to-carbon unsaturation. The invention further relates to blends or mixtures of such copolymers with another polymer of butadiene. Particularly desirable as polymers of butadiene for admixture with the copolymers of the invention are the so-called graft copolymers of a polymerizable compound containing aliphatic carbon-to-carbon unsaturation and a butadiene polymer, particularly a polybutadiene. The invention further relates to process for producing the foregoing polymer compositions.

DETAILED DESCRIPTION OF THE INVENTION

The polymerizable compounds useful in preparing the polymers of the invention are generally those unsaturated monomers containing aliphatic carbon-to-carbon unsaturation, which are polymerizable or copolymerizable by free radical catalysts either alone or in admixture with other polymerizable compounds. Suitable unsaturated monomers generally have two to about eight carbon atoms per molecule. Typical polymerizable compounds include the vinyl aromatic hydrocarbon compounds, such as styrene, vinyl toluene, alpha-methyl styrene, p-methyl styrene and other such alkyl styrenes, the chlorostyrenes, and the like; $\alpha,\beta$ unsaturated nitrile compounds such as acrylonitrile, methacrylonitrile, ethacrylonitrile, methylene glutaronitrile, and the like; the acrylamides, such as acrylamide, N-n-butyl acrylamide, N-tert-butyl acrylamide, N,N-dimethyl acrylamide, N-phenyl acrylamide, $\alpha$-chloroacrylamide, N-cyclohexyl acrylamide, methacrylamide, N-(1,1-dimethyl-3-oxobutyl)acrylamide, and the like; acrylic acid and its esters such as methyl acrylate, ethyl acrylate, butyl acrylate, 2-ethylbutyl acrylate, 2-ethylhexyl acrylate, octyl acrylate, methoxyethyl acrylate, butoxyethyl acrylate, and the like; methacrylic acid and its esters such as methyl methacrylate, butyl methacrylate, hexyl methacrylate, lauryl methacrylate, and the like; crotonic acid and its esters, such as ethyl crotonate, butyl crotonate, and the like; alpha, beta-unsaturated acids and esters, such as maleic anhydride, fumaric acid, dimethyl maleate, dibutyl maleate, diethyl fumarate, dihexyl fumarate, and the like; other unsaturated esters such as allyl acetate, allyl phthalate, allyl succinate, allyl adipate, allyl phosphate, allyl chlorendates, allyl tetrachlorophthlate, and other allyl esters; other vinyl compounds such as vinyl acetate, vinyl benzoate, vinyl ethers, vinyl chloride, vinylidene chloride, vinyl ketones, vinyl pyridine, and the like; halogenated olefins, such as tetrafluoroethylene, chlorotrifluoroethylene, perfluoropropene, and the like; the aliphatic diolefins, such as butadiene, isoprene, dimethylbutadiene, and the like; and other polymerizable or copolymerizable, unsaturated monomers. Especially useful are selected mixtures of the foregoing monomers.

In the preparation of the copolymers of the invention at least one or more of the foregoing polymerizable compounds is reacted with a butadiene polymer. Polymers of butadiene that can be used in this invention are the various ethylenically unsaturated polybutadienes prepared by mass, solution or emulsion polymerization techniques, butadiene-styrene copolymers made by emulsion and solution methods, butadiene-styrene block copolymers, copolymers of butadiene with acrylonitrile, methacrylonitrile and terpolymers such as styrene-acrylonitrile-butadiene termpolymers, and the like. Also useful are the polybutadienes consisting of over 90 percent 1,4 addition and only 7.5 percent vinyl structure, the cis-1,4 configuration comprising 32-35 percent of the polymer.

In the process of the invention the polymerizable components are added to a reaction vessel and an aqueous medium and insoluble components are converted to an emulsion and then the emulsion is converted to a suspension. Thereafter the polymerizable components are reacted to produce the copolymers of the invention. In the formation of the emulsion of the polymerizable components which are water insoluble a polymerizable monomer such as styrene is added to a polybutadiene either in latex form or where the solid form is used the polybutadiene can be dissolved in the styrene. These components are then emulsified in a medium such as water, using suitable emulsifying agents. An additional comonomer such as acrylonitrile can be added either before or after the emulsification step. In the second step of the process the emulsion of polymerizable components that are water insoluble is converted to a suspension by the addition of suitable suspending agents. Then the polymerizable components are reacted usually at elevated temperature to produce the copolymers of the invention.

The preferred liquid medium for the emulsions and suspensions is water. Also useful are aqueous salt solutions, for example, sodium chloride and other salt solutions, and aqueous alcoholic solutions, such as water-alcohol, water-glycol and water-glycerol solutions.

Emulsifying agents include sodium or potassium fatty acid soaps, rosin, disproportionated rosin or hydrogenated rosin soaps, salts of sulfonated alkyl benzenes, salts of sulfated alcohols, phosphoric acid esters and salts and other anionic surface active agents. Non-ionic emulsifiers, such as oxyalkylated phenols, alcohols or polyethers can be used, as well as mixtures of non-ionic and anionic emulsifying agents.

The suspending agent or stabilizer prevents the pearls or particles of polymer from adhereing together as the polymer passes through a sticky stage in the course of preparation. The suspending agents or stabilizers of the invention are the alkaline earth metal phosphates, such as the phosphates of calcium, barium, strontium and magnesium. The suspending agents as used in the process of the invention are prepared in situ by reaction of a water soluble phosphate such as a salt with a water soluble calcium compound such as a salt. Such agents or stabilizers are generally employed in small, but effective amounts, generally from about 0.1 to 5 weight per cent of suspending agent based on the weight of the polymeric starting material. The suspension medium is generally employed in a weight ratio in the range of 10 parts of medium per part of polymer to about 1 part of medium per part of polymer starting material.

The polymerizable monomers are employed in a proportion of about 70 to about 90, preferably 50 to 90 weight percent of polymerizable compound based on the total weight of copolymerizable components (monomer and butadiene polymers). In a preferred aspect of the invention, a mixture of styrene with acrylonitrile, methacrylonitrile or mixtures thereof are used as the polymerizable compound in a proportion of about 50 to about 90 weight percent of polymerizable compound based on the total weight of the copolymerizable components, wherein from about 10 to 50 weight percent of the mixture of polymerizable compounds is acrylonitrile and/or methacrylonitrile, In still another preferred aspect, a mixture of α-methyl styrene with acrylonitrile, methacrylonitrile or mixtures thereof are used as the polymerizable compound in a proportion of about 50 to about 90 weight percent of polymerizable compound based on the total weight of the copolymerizable components, wherein from about 30 to 50 weight percent of the mixture of polymerizable compounds is acrylonitrile and/or methacrylonitrile. Mixtures of styrene and α-methyl styrene can also be employed in the foregoing aspects of the invention.

The reaction of the polymerizable compounds with a butadiene polymer is preferably catalyzed with a free radical type catalyst, but can also be catalyzed by suitable ionizing radiation, such as β-rays, γ-rays, neutrons, accelerated electrons and heavy particles, X-rays, and the like. Ozone can also be employed as an initiator for this reaction. Generally, in suspension or solution polymerization techniques, water insoluble catalysts are employed, such as benzoly peroxide, lauroyl peroxide, cumene hydro peroxide, isopropyl peroxydicarbonate, dicumyl peroxide, t-butyl perbenzoate, di-t-butyl peroxide, phenyl cyclohexane hydroperoxide, diisopropyl benzene dihydroperoxide, methyl ethyl ketone peroxide, chlorobenzoyl peroxide, and the like. The catalyst is generally employed in the reaction mixture in a small but catalytic amount usually in the range from about 0.1 to 2 weight percent of catalyst based on the total weight of copolymerizable components in the reaction mixture. However, larger or smaller quantities of catalyst can be employed depending on other variables involved in the reaction and the desired characteristics of the end products. Chain terminators can also be employed in the reaction mixture to regulate or control the characteristics of the final products. Suitable chain terminators include the mercaptans, such as butyl mercaptan, dodecyl mercaptan, and the like; halocarbons such as carbon tetrachloride, trichloroethylene, perchloroethylene, and the like; cumene, cymene, diisopropyl benzene, and the like. Considerable latitude in the reaction temperature and time is permissible depending upon the other variables such as reaction catalysts that are employed, as well as depending upon the desired characteristics of the final product. Generally, the reaction temperature is in the range of 0 to 150° centigrade, preferably in the range of 50 to 100° centigrade. Reaction time can vary from 1 to 24 hours or greater. Atmospheric pressure is generally employed, although the reaction can also be conducted at super atmospheric pressure or under vacuum.

The copolymers of the polymerizable compound with a butadiene polymer have an inherent viscosity in the range of 0.3 to 2 dl/g more usually in the range of 0.5 to 1.2 when measured in solution of 60 volume percent toluene and 40 volume percent dimethyl formamide. The weight average molecular weights of the polymers of the invention are generally about 100,000 or higher more usually about 150,000 to 300,000; the number average molecular weights ranges from about 50,000 - 100,000. The solubility of the copolymers of the invention is somewhat dependent on what monomers are involved in their preparation. The copolymers are generally insoluble in compounds such as aliphatic hydrocarbons for instance, hexane and the like and alcohols, for instance, methanol and the like.

By the process of the invention improved impact strength can be obtained without reduction in tensile strength as compared to polymers of the prior art. Additionally, it is possible to obtain polymers having improved impact resistance without a reduction in heat distortion point. While not bound by any mechanism involved in obtaining these improved polymers, it is believed that the process of suspension polymerization under the conditions involved and with the ratios chosen of ingredients that provides these improved properties in the polymers obtained.

Polymers of the prior art have been found to have impact values from between 2 to 6 most usually between 3 to 5 and tensile strengths ranging from 4000 to 5000 pounds per square inch. Heat distortion points of polymers of the prior art range from 70°C. to 80°C as measured on injection molded specimens one-eighth inch × one-half inch × 5 inches and from 90°C. to 100°C. on annealed specimens. The polymers of the invention have tensile strengths ranging from 4,000 to 7,000 psi, and higher, heat distorsion points ranging from 70°C. to 80°C., and impact values ranging from 7.5 to 11 and higher, most generally 8 to 10, and these values are obtained without significant loss in heat distortion point values which range from 70 to 80° centigrade.

The polymers of the invention may be used as additives in halogenated vinyl polymers such as poly(vinylchloride) or copolymers of poly(vinylchloride) and poly(vinylacetate) or copolymers of poly (vinylchloride) and poly acrylates such as those derived from methyl methacrylate or ethyl acrylate to provide improved impact strength in the blended compositions.

In order to provide compositions of the invention which are fire retardant, there can be employed in admixture with polymers of the invention halogen-containing and phosphorus containing polyester resins such as is disclosed in S.N. 775,161 filed Nov. 12, 1968 now U.S. 3,577,478 which is hereby incorporated by reference.

The polyester generally contains a maximum of five percent of polycarboxylic compound or polyhydric alcohol or both, that contains polymerizable aliphatic carbon-to-carbon unsaturation. The polyesters useful in the invention are generally the reaction products of a polycarboxylic compound and a polyhydric alcohol. By polycarboxylic compound is meant the polycarboxylic acids, polycarboxylic acid anhydrides, polycarboxylic acid halides, and polycarboxylic acid esters. The polyesters can be prepared from saturated carboxylic and polyhydric compounds or can contain up to about five mole percent of polycarboxylic compound and/or polyhydric alcohol that contains aliphatic carbon-to-carbon unsaturation. The unsaturation can thus be provided in either or both the polycarboxylic compound or the polyhydric alcohol.

The saturated polycarboxylic useful in the preparation of the polyesters can be aliphatic, cycloaliphatic, aromatic or heterocyclic. Illustrative of these polycarboxylic acid, acid halides, acid anhydrides and acid esters are phthalic, isophthalic, terephthalic, tetrachlorophthalic, adipic, succinic, and mixtures thereof. Suitable saturated polyhydric alcohols for use in the preparation of the polyester resins include ethylene glycol, diethylene glycol, propylene glycol, dipropylene glycol, butane diol, pentane diol, hexane diol, glycerol, mannitol, sorbital, bisphenols, such as 2,2-bis(4-hydroxyphenyl) propane and bis(4 - hydroxyphenyl) methane: substituted bisphenols, such as bis(3 - chloro-4-hydroxyphenyl) methane, hydrogenated bisphenols and mixtures thereof.

Suitable unsaturated polycarboxylic acids having polymerizable aliphatic carbon-to-carbon double bonds, and the corresponding acid halides, esters, and anhydrides include maleic, chloromaleic, ethylmaleic, itaconic, citraconic, zeronic, pyrocinchoninic and acetylene dicarboxylic, either alone or in mixtures. Illustrative of the unsaturated polyhydric alcohols having polymerizable aliphatic carbon-to-carbon double bonds, which can be used in providing the unsaturation in the linear polyester molecules are compounds, such as butene diol, pentene diol, the unsaturated hydroxy ethers, such as allyl or vinyl glycerol ethers, allyl or vinyl pentaerythritol ethers and the like.

Fire-resistant copolymer compositions of the invention can be provided by employing polyester resins that contain either or both an adduct of hexahalocyclopentadiene and a polycarboxylic compound containing aliphatic carbon-to-carbon unsaturation and an adduct of hexahalocyclopentadiene and a polyhydric alcohol containing aliphatic carbon-to-carbon unsaturation. The halogen atoms of these adducts are selected from the group consisting of fluorine, chlorine and bromine and mixtures thereof. The preferred polyester resins of the invention are the reaction products of a polycarboxylic adduct of hexahalocyclopentadiene and a polyhydric alcohol. Such polyesters can also contain an unsaturated polycarboxylic compound and/or unsaturated polyhydric alcohol, as well as additional saturated polycarboxylic compounds and polyhydric alcohols of the type disclosed hereinbefore. Also useful are the polyesters that are the reaction product of a polyhydric alcohol adduct of hexahalocyclopentadiene and a polycarboxylic compound. Such polyester resins can also contain an unsaturated polycarboxylic compound and-/or an unsaturated polyhydric alcohol, as well as additional saturated polycarboxylic compounds and polyhydric alcohols of the type disclosed hereinbefore.

Among the adducts of hexahalocyclopentadiene and polycarboxylic compounds which may be used are:
1,4,5,6,7,7-hexachlorobicyclo-(2.2.1)-5-heptene-2,3-dicarboxylic acid;
1,4,5,6,7,7-hexachlorobicyclo-(2.2.1)-5-heptene-2,3-dicarboxylic anhydride;
1,4,5,6,7,7-hexachloro-2-methyl-bicyclo-(2.2.1)-5-heptene-2,3-dicarboxylic anhydride;
the mono- or dimethyl ester of 1,4,5,6,7,7-hexachlorobicyclo-(2.2.1)-5-heptene-2,3-dicarboxylic acid;
1,4,5,6-tetrachloro-7,7-difluorobicyclo-(2.2.1)-5-heptene-2,3-dicarboxylic acid;
1,4,5,6,7,7-hexachlorobicyclo-(2.2.1)-5-heptene-2-acetic-2-carboxylic anhydride;
1,4,5,6,7,7-hexachlorobicyclo-(2.2.1)-5-heptene-2,3-dicarbonyl chloride;
5,6,7,8,9,9-hexachloro-1,2,3,4,4a,5,8,8,a-octahydro-5,8-methano-2,3-naphthalene dicarboxylic acid and anhydride, and
1,2,3,4,5,6,7,7-octachloro-3,6-methano-1,2,3,6-tetrahydrophthalic acid and anhydride.

Among the adducts of hexahalocyclopentadiene and polyhydric alcohols which may be used are:
1,4,5,6,7,7-hexachloro-2,3-bis-hydroxymethylbicyclo-(2.2.1)-5-heptane;
1,4,6,7,7-hexachloro-2,3-bis-hydroxymethylbicyclo-(2.2.1)-2.5-heptadiene;
3-(1,4,5,6,7,7-hexachlorobicyclo-(2.2.1)-5-heptene-2-yl)-methoxy-1,2-propanediol;
1,4,5,6-tetrachloro-7,7-difluoro-2,3-bis-hydroxymethyl-bicyclo-(2.2.1)-5-heptene;
1,4,5,6,7,7-hexabromo-2,3-bis-hydroxymethyl-bicyclo-(2.2.1)-5-heptene;
3-(1,4,5,6-tetrachloro-7,7-difluorobicyclo-(2.2.1)-5-heptene-2-yl)-methoxy-1,2-propane diol.
These compounds and methods of preparation are disclosed in U.S. Pat. No. 3,007,958, issued Nov. 7, 1961.

It is also within the scope of the invention to use other halogen-containing polyesters such as those derived from tetrachlorophthalic acid anhydride. The polycarboxylic compounds and polyhydric alcohols required in the production of the foregoing halogen containing adducts and polyesters can be provided by using any of the compounds disclosed hereinbefore.

The temperature for the reaction between polyhydric alcohols and polybasic acids ranges from about 100 to 200° centigrade, although higher or lower temperatures can be used. Esterification catalysts such as paratoluene sulfonic acid, benzene sulfonic acid, beta-naphthalene sulfonic acid and the like, or amines such as pyridine, triethyl amine, quinoline and the like can be added to the reaction mixture. The proportion of polyhydric alcohol is approximately controlled by the total mol proportion of acids in the esterification reaction mixture. It is also preferred to react the polyhydric alcohols and polybasic acids in roughly equimolar proportion, however, either the acids or alcohols can be used in substantial excess, if it is desired to form a low molecular weight polyester resin.

Phosphorus-containing polyester resins are also useful for preparing the copolymer compositions of the invention. Suitable phosphorus-containing polyester resins are the phosphonated polyester resins that result from the reaction of a trialkyl phosphite or a dialkyl phosphite with an unsaturated polyester resin. Among such products are the polymeric reaction products of components comprising a reactive phosphite of the formula

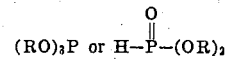

and an unsaturated polyester resin which contains aliphatic carbon-to-carbon double bonds that are conjugated with carbonyl groups, which products have phosphorus atoms attached directly to carbon atmos which were present in the resin prior to reaction with the phosphorus compound. More particularly, the polymer of a trialkyl phosphite comprises the polymeric reaction product of a reactive phosphorus compound of the formula $(RO)_3P$ and an unsaturated polyester resin which contains at least one carboxylic acid group per molecule that is conjugated with an aliphatic carbon-to-carbon double bond. The polymers of dialkyl phosphites preferably comprise a polymeric product of the reaction conducted in the presence of an alkaline catalyst, of components comprising a reactive phosphorus compound of the formula

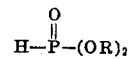

and an unsaturated polyester resin containing aliphatic carbon-to-carbon double bonds that are conjugated with carboxylic acid groups and which has an acid number of less than 30. In the foregoing formulas, each R is independently selected from the group consisting of alkyl, cycloalkyl, alkenyl, aryl, alkylaryl and arylalkyl, and halo-substituted or other substituted organic radicals of the foregoing group containing substituents which do not interfere in the reaction with ethylenically unsaturated polyester. The preferred phosphorus compounds for preparing the phosphonated polyesters are the lower alkyl phosphites such as trimethyl phosphite and dimethyl phosphite and the lower alkenyl phosphites, such as triallyl phosphite and diallyl phosphite. Other specific phosphites that can be used are those where the R radicals are methyl, ethyl, isopropyl, butyl, hexyl, n-octyl, 2-ethylhexyl, decyl, hexadecyl, phenyl, benzyl, tolyl, cyclohexyl, allyl, crotonyl, beta-choroethyl, beta-bromoethyl, beta-methoxyethyl, beta-ethoxyethyl, beta-butoxyethyl, beta-phenoxyethyl, tetrahydrofurfuryl, tetrahydropyranyl and mixtures thereof. Generally, it is preferred that no more than two aryl substituents be utilized. In general, the length of the carbon chains or number of carbon atoms in the aryl nuclei in the organic radicals of the phosphorus compound is not critical and may vary over wide ranges. The lower limit is the lowest possible number of carbon atoms such as one carbon atom in the alkyl groups and six carbon atoms in aryl groups and the upper limit is any practical number. However, a higher percent by weight of phosphorus can be incorporated into the polymer in instances where the organic radicals attached to the phosphorus atoms in the organic radicals R preferably contain from one to about 6 to 8 carbon atoms. In some instances, it may be desirable to provide halogen-containing groups for R to further enhance the fire resistance and thereby obtain a still further improved polymer.

The trialkyl phosphites readily react without the aid of a catalyst with unsaturated polyester resins of the type described hereinbefore, but which are further characterized by having at least one terminal carboxylic acid group per molecule that is conjugated with an aliphatic carbon-to-carbon double bond. Usually the resins are terminated with more than one and preferably more then two such carboxylic acid groups. More particularly, the unsaturated polyester resin reacted with the trialkyl phosphites are those having an acid number greater than 30, preferably greater than about 100. The acid number can vary up to about 500. Recently, it has been found the terminal carboxylic acid group is not required in the polyester, if there is provided in the reaction mixture a saturated monocarboxylic acid of two to 18 carbon atoms, such as acetic acid, propionic acid, benzoic acid, and the like. The unsaturated polyester resins can also contain one or more internal aliphatic carbon-to-carbon double bonds per molecule that are conjugated with carbonyl groups. Also, the unsaturated polyester resins can be terminated with one or more carbonyl groups, such as those provided by reaction with aldehydes and ketones.

It is preferred to carry out the reaction of the dialkyl phosphites with unsaturated polyester resins in the presence of an alkaline or anhydrous base catalyst. Examples of suitable catalysts include metallic sodium, potassium and lithium; the alkali metal amides, such as sodamide; the alkali metal hydrides, such as sodium hydride and potassium hydride; alkali metal alcoholates (alkoxides), such as sodium methylate and potassium ethylate; sodium naphthalene; the secondary and tertiary amines, such as diethylamine and triethylamine; and the salts of phosphite diesters such as sodium or potassium diethyl phosphite. The amount of catalyst employed is not critical, provided that a catalytic amount of the catalyst is available during the reaction; usually about 0.5 to 5 weight percent of catalyst based on the weight of the reactants is a satisfactory amount. The unsaturated polyester resins that are preferred for reaction with the dialkyl phosphites are those resins that are substantially completely terminated in carboxylic acid ester groups. Such resins generally contain less than an average of one carboxylic acid group per molecule and thereby avoid consuming the alkaline catalyst used in the reaction. More particularly, these unsaturated polyester resins have an acid number of less than 30, perferably in the range of zero to about ten. These resins also contain at least one and preferably two or more carbon-to-carbon double bonds that are conjugated with a carbonyl group. They can also contain "internal" double bonds that are conjugated with a carbonyl group that does not occur at the end of a polymer chain. Generally, the unsaturated polyester resins used in the preparation of the phosphonated polyesters can contain various proportions of unsaturated components introduced through the acidic component, alcohol or alkenyl phosphite. However, the resulting phosphonated polyesters used in preparing the copolymers of the invention are characterized by having a maximum of five mole percent of polycarboxylic and polyhydric components that contain aliphatic carbon-to-carbon unsaturation.

The phosphonation temperature can vary over wide ranges, such as from about 20° centigrade up to about 200 to 250° centigrade or higher. Temperatures below about 130° centigrade give better results in some instances. The reaction is carried out for a period of time sufficient to assure the addition of the phosphorus compound to the desired number of carbon-to-carbon double bonds, and reaction times and temperatures are not otherwise critical within the acceptable limits mentioned above. A solvent can be employed, if desired, and in instances where a solvent is employed it can be a material such as an ether, such as diethylether, aromatic hydrocarbons, such as benzene, and the like. The phosphorus compound is added to the unsaturated polymer in a proportion sufficient to impart the desired degree of flame resistance or other desirable properties to the final copolymer product of the invention. Generally, it is preferred that the unsaturated polyester be reacted with a sufficient proportion of phosphorus compound to provide from about 0.5 to about 10 weight percent of phosphorus in the phosphonated polymer. However, larger amounts of phosphorus can be added when desirable, such as 15 or 20 weight percent of the phosphonated polymer.

Other phosphorus-containing polyester resins known in the art can also be suitably employed in the preparation of the copolymer products of the invention. Also, it is within the scope of the invention to utilize various mixtures of halogen-containing polyesters and phosphorus-containing polyesters, as well as admixtures with polyester resins that contain neither halogen or phosphorus atoms.

Other useful fire retardant additive are described in U.S. Pat. Nos. 1,162,453, 2,069,183 and 3,403,036. In the preparation of the fire retardant compositions of the invention, the halogen and/or phosphorus is present in a proportion sufficient to render said copolymer fire retardent. The actual proportion of halogen and/or phosphorus depends on the source of halogen or phosphorus since some compounds are more efficient in imparting fire retardance than others. Thus, when chlorendic acid is the source of halogen, at least about 5 weight percent chlorine based on the weight of polymer composition is sufficient. However, when other chlorine-containing compounds are employed, more chlorine is required. The use of some combinations of halogen and phosphorus compounds reduces the total requirement for fire retardant component in the compositions.

Generally, from about 10 to about 90 weight percent of the butadiene copolymer of the invention is employed in the mixed polymer composition based on the total weight of the mixed polymer composition. When the polymer composition also includes effective fire retardant proportions of the polyester and other additives hereinbefore described, the compositions have superior fire retardance as well as chemical resistance and improved physical properties such as impact strength and tensile strength as compared with a butadiene copolymer of the prior art used with such fire retardant additives.

Various additives can be employed to advantage in combination with the copolymers of the invention. Particularly useful are stabilizers to protect the polymer compositions against degradation caused by various environmental factors. Suitable stabilizers can be classified into four groups as described in U.S. Pat. No. 3,418,263 which is hereby incorporated by reference. In addition to the foregoing groups of organo metallic compounds, useful stabilizers include dibasic lead phosphite and the lead carboxylates, and Group II metal sulfides such as zinc sulfide and barium sulfide.

Antioxidant materials that can be incorporated with the polymers of the invention are bis-phenol, bis-phosphites and bis-phosphite esters of alkylidene diphenyl as described in U.S. Pat. No. 3,484,506 and U.S. Pat. No. 3,448,179 which are hereby incorporated by reference.

Additives that can be used to further enhance the fire resistance of the polymer compositions of the invention include antimony trioxide in the various forms in which it is commercially available, for example, deposited on silica, as well as various other inorganic antimony compounds such as antimony sulfide, sodium antimonite, potassium antimonite and the like. Organic antimony compounds are also suitable such as the antimony salts of organic acids and their pentavalent derivatives, for example, antimony butyrate, antimony valerate, antimony caproate, antimony caprylate, antimony anisate and their pentavalent dihalide derivatives. Likewise, the esters of antimonous acids and their pentavalent derivatives are useful such as tris(n-octyl) antimonite, tribenzyl antimonite, tris(beta-chloroethyl)antimonite, and their pentavalent dihalide derivatives. Still other suitable organic antimony compounds are the cyclic antimonites, such as trimethylol propane antimonite, and the like. The corresponding arsenic and bismuth compounds can also be employed. Other suitable additives include lubricants, such as stearic acid and other higher fatty acids, as well as calcium stearate and other higher fatty acid metal salts.

The polymers of the invention can be blended with other polymers of butadiene such as prior art copolymers of a polymerizable monomer and a polybutadiene.

The polymer compositions of the invention can be used to produce moldings, by blow molding, injection molding and compression molding methods; extrusions, including extruded pipe; laminates, and coating compositions. The usual conditions employed in the art are useful in shaping the polymer compositions in the desired application. For example, the polymer compositions can be molded at temperatures in the range of 300 to 500° Fahrenheit, preferably at 350 to 450° Fahrenheit.

The invention is further described in the following specific examples which are intended to further illustrate the invention, but not to limit it. Throughout this specification and claims, the temperatures are in degrees centigrade, and the parts are by weight unless indicated otherwise.

BUTADIENE COPOLYMERS

EXAMPLE 1

One hundred eighty parts by weight of water, 19.4 parts on a solids basis by weight of the polybutadiene rubber designated "GR-S2004," the preparation of which is described in Example II of U.S. Pat. No. 3,111,501 which is hereby incorporated by reference, 0.20 part of dioctyl sodium sulfo succinate, 58 parts of styrene, and 22.6 parts of acrylonitrile, were charged into an agitated reactor and heated to 50° centigrade to provide an emulsion. Forty-eight parts of a one molar triammonium phosphate solution were added to the reaction mixture and the resulting suspension of reactants was stabilized by the addition of 40 parts by weight of a 1.5 molar solution of calcium chloride, 0.065 part of dodecyl mercaptan and 0.84 part benzoyl peroxide were then added and the suspension was heated at 70° centigrade for a period of about 12 hours at the end of the reaction 0.5 parts of dibutyl paracresol to stop the polymerization and to protect against oxidation during processing. Thereafter the reaction mixture was steam distilled to remove unreacted monomer following which the reaction mixture was acidified with hydrochloric acid to a pH in the range of 3.0 to 4.0 to dissolve the tricalcium phosphate suspending agent. The resulting polymer was filtered from the reaction and was washed to free it of chloride ion. The copolymer product was dried in an oven at 70° centigrade for 16 hours. The polymer compositions were rolled on a hot rubber mill and injection molded into test specimens measuring one-eighth inch by one-half inch by 5 inches. The molded products were found to have a flexural yield strength of between 10 and 11 thousand pounds per square inch a flexural modulus of $3.4 \times 10^5$ pounds per square inch and a heat distortion temperature of 80 degrees centigrade. Average tensile strength was 6,000 psi. and impact strength was an average of 7.5 foot pounds per inch. Further results are shown in Table I.

EXAMPLE 2

Using the same procedure as in Example 1, 20.0 arts on a solids basis of polybutadiene lates (60 percent solids) 39 parts of styrene, 2.5 parts of acrylonitrile, 33.5 parts of methacrylonitrile and 5 parts of ethyl acrylate were combined with 160 parts of water and 0.2 parts of dioctyl sodium sulfosuccinate and stirred to form an emulsion and subsequently heated to 40 to 45° centigrade. A suspension was obtained by adding freshly prepared triammonium phohspate solution 80 parts on a volume basis of a one molar solution and calcium chloride solution 80 parts by volume of a 1.5 molar solution. The temperature was raised to 55°C to 65°C. and benzoyl peroxide, 0.7 part was added then dodecyl mercaptan, 0.1 part was added and the reactants were heated at 70 degrees centigrade for 16 hours and then cooled to below 40 degrees centigrade. Dibutyl paracresol, 0.5 part was added and the suspension broken by the addition of concentrated hydrochloric acid (7 parts). Then the coagulated polymer washed until the washings were free from chloride ion. The polymer was dried overnight in a forced air oven at 70 degrees centigrade. The yield of polymer was 98 percent. Physical test results are shown in Table I.

TABLE I

| Example Number | Heat Distortion °C. | Flexural Yield Strength (psi) | Tensile (yield) Notched Strength (psi) | Impact (Av) Strength ft.lb./in. of Notch |
|---|---|---|---|---|
| 1 | 73 | 10,000 | 6000 | 7.5 |
| 2 | 77 | 9.560 | 5427 | 7.1 |

POLYESTER RESINS

EXAMPLE 3

65.1 parts of ethylene glycol were introduced to a reactor and heated to 110 degrees centigrade. Thereafter, 389 parts of chlorendic acid were added to the ethylene glycol slowly with agitation. The temperature of the reaction mixture was raised to 165–170° centigrade and the water of esterification was removed with an inert gas stream that was passed through the reaction mixture. The reaction was terminated when the acid number had been lowered to a range of 15 to 20.

EXAMPLES 4 to 18

Additional polyesters were prepared in accordance with the procedure of Example 3, but in which different reactants and ratios of reactants were employed. The reactants and proportions and the acid numbers of the resulting polyester resins are tabulated in Table II.

EXAMPLE 19

An additional polyester was prepared in accordance with the procedure of Example 3, except that the reaction was terminated when the acid number reached about 55. The molecular weight of the polyester was determined by vapor pressure osmometer, with the following results.

In tetrahydrofuran 952
In methylethylketone 986 Other data are shown in Table II.

glycol, neopentyl glycol and the phosphites employed were triethyl phosphite, tributyl phosphite, tris(βchloroethyl) phosphite and tris(chloropropyl) phosphite.

EXAMPLE 21

A polyester resin containing both halogen and phosphorus was prepared in the following manner. 125.5 parts by weight of ethylene chlorophosphite and 150 parts by weight of methylene chloride were introduced to a reaction vessel. The resulting solution was heated to 50° centigrade, and thereafter 58 parts of acetone containing 0.13 part of water were added slowly to the reaction mixture. The temperature was maintained at 45–50° centigrade for 16 hours. Then, methylene chloride was removed from the reaction mixture by distillation, the latter part of the distillation being conducted under vacuum at 120° centigrade. The resulting phosphonate polyester contained 16.7 weight percent phosphorus and 19.4 weight percent chlorine.

POLYMER BLENDS

EXAMPLE 22

22.5 parts of the polyester of Example 3 were compounded with 77.5 parts of the polymer of Example 1

TABLE II

| Example No.: | Acid | Moles of acid | Auxiliary acid | Moles of auxiliary acid | Glycol | Moles glycol | Auxiliary glycol | Moles of auxiliary glycol | Acid No. polyester resin |
|---|---|---|---|---|---|---|---|---|---|
| 3 | CA | 1.0 | | | EG | 1.05 | | | 16.9 |
| 4 | CA | 1.0 | | | PG | 1.05 | | | 15.8 |
| 5 | CA | 1.0 | FA | 0.5 | DEG | 1.10 | | | 7.8 |
| 6 | CA | 1.0 | | | PG | 0.52 | DEG | 0.525 | 15.6 |
| 7 | CA | 1.0 | MA | 0.05 | EG | 1.05 | | | 17.8 |
| 8 | CA | 1.0 | | | PG | 1.02 | METP | 0.03 | 19.5 |
| 9 | CA | 1.0 | FA | 0.05 | EG | 1.05 | | | 13.3 |
| 10 | CA | 1.0 | FA | 0.10 | EG | 1.15 | | | 17.9 |
| 11 | CA | 1.0 | MA | 0.05 | NPG | 1.10 | | | 16.1 |
| 12 | CA | 1.0 | MA | 0.05 | PG | 1.10 | | | 17.6 |
| 13 | CA | 1.0 | THPA | 0.10 | PG | 1.15 | | | 14.9 |
| 14 | CA | 1.0 | | | EG | 0.99 | BG | 0.11 | 18.0 |
| 15 | TCPA | 1.0 | FA | 0.05 | EG | 1.10 | | | 27.3 |
| 16 | HCNA | 1.0 | | | EG | 1.1 | | | 20.2 |
| 17 | TBPA | 1.0 | | | EG | 1.1 | | | 25.0 |
| 18 | CA | 1.0 | MA | 0.03 | PG | 1.08 | | | 19.1 |
| 19 | CA | 1.0 | | | EG | 1.05 | | | 55 |

NOTE.—CA=Chlorendic Acid; TCPA=Tetrachlorophthalic Anhydride; TBPA=Tetrabromophthalic Anhydride; THPA=tetrahydrophthic anhydride; HCNA Hexachlorooctahydro-5,8-methano-2,3-napththalene dicarboxylic Anhydride; BG=1,4-Butanediol; DEG=Diethylene Glycol; EG=Ethylene Glycol; METP=Monoallylether of Trimethylylopropane; NPG=Neopentyl Glycol; PG=Propylene Glycol.

EXAMPLE 20

A phosphorus-containing polyester resin was prepared in the following manner. 98 parts by weight of maleic anhydride and 79.8 parts of propylene glycol were heated together at 200–210° centigrade in a reactor provided with an inert gas sparge for purging the water of esterification. The reaction was continued until the acid number of the polyester was reduced to about 35. Then the polyester was cooled to about 110° centigrade and 180 parts of acetic acid were added to the polyester. The acetic acid solution was reheated to 100° centigrade and 124 parts of trimethyl phosphite were added slowly, while cooling the reaction mixture to remove the heat of reaction. The methyl acetate formed in the reaction was vaporized and continuously removed from the reaction mixture. After all the trimethyl phosphite was added, the temperature of the reaction mixture was gradually raised to 160 degrees centigrade and the reactor was maintained under vacuum to remove the methyl acetate and excess acetic acid. The resulting resinous polyester had a phosphorus content of 11 weight percent.

Similar polyester resins were prepared by the foregoing procedure, but the glycols employed were ethylene and compounded with 5 parts of antimony trioxide and suitable stabilizers consisting of 3 parts potassium fluoborate, 1 dibutyl tin maleate, 1 part 4,4' butylidene bis (6 tertiary butyl meta cresol), 0.5 part dilauryl thiodipropionate, 0.5 part low molecular weight polyethylene wax, and 0.1 part polypropylene-ethylene glycol. The polymer compositions were rolled on a hot rubber mill and injection molded into test specimens measuring 5 inches by one-half inch by one-eighth inch. Test results are shown in Table III.

EXAMPLE 23

Using the procedure of Example 1, 19 parts of a linear solution grade of polybutadiene containing 30–35% of 1,4 cis unsaturation was added to a reaction vessel together with the other components as shown in Example 1 and made into a polymer by the procedure of Example 1. The polymer obtained was dried and 22.5 parts of the polyester of Example 3 were compounded with 77.5 parts of the polymer obtained in Example 1. Five parts of antimony trioxide was then added together with suitable stabilizers as in Example 22 and the polymer composition was then rolled on a hot rubber mill and injection molded into test specimens measuring 5 inches by one-half inch by one-eighth inch. A comparison of physical properties of the polymer with Example 24 containing the polyester of Example No. 3 is shown in Table III.

EXAMPLE 24

22.5 parts of the polyester of Example 3 were compounded with 77.5 parts of the polymer of Example 23 and compounded with 5 parts of antimony trioxide together with suitable stabilizers as in Example 22. The polymer composition was then rolled on a hot rubber mill and injection molded as in Example 23. Physical test results are shown in Table III.

TABLE III

| Example Number | Notched Izod Impact Strength ft.lbs/in. of Notch | Tensile Strength (yield) psi | Heat distortion temp. (°C.) at 264 psi |
|---|---|---|---|
| 1 | 7.5 | 6000 | 73 |
| 22 | 3.7 | 5380 | 73 |
| 23 | 6.4 | 4900 | 74 |
| 24 | 5.8 | 6060 | 72 |

EXAMPLE 25

86.5 parts of the polymer of Example 1 were compounded with 13.5 parts of the tetrabrominated Diels-Alder adduct of hexachlorocyclopentadiene and styrene. Blending was accomplished by stirring for 2 minutes in a Waring blender. The formulation was then blended with 6 parts of antimony trioxide, 7 parts of titanium dioxide and suitable stabilizers as shown in Example 22 by rolling on a hot rubber mill and the composition was then injection molded into test specimens measuring 5 inches by one-half inch by one-eighth inch. Physical test results were obtained showing a tensile strength in pounds per square inch of 5290, a notched impact strength in ft. lbs. per inch of notch of 6.8 and a heat distortion temperature in degrees centigrade of 72.5. A fire retardancy test using the Underwriters Laboratory Test UL-94 showed that the specimens passed the test.

COMPARATIVE EXAMPLES

EXAMPLE 26

Using the same ratio of ingredients as in Example 1, polymerization was conducted by an emulsion polymerization technique by omission of the addition of the triammonium phosphate and calcium chloride solutions. Polymerization was conducted at 70° centigrade for 10 hours. At the end of the reaction period dibutyl paracresol was added to stop polymerization. The emulsion was diluted with an equal volume of water and heated to 90° centigrade. A 2 percent solution of calcium chloride was added portion wise until the emulsion broke. Water was decanted off and the polymer filtered and washed until the washings were free from chloride ion. The yield of polymer was 81 percent. A blent was made up of 25 parts of the polyester of Example 3 and 86 parts of the dry emulsion polymer of Example 26. Blending was accomplished by stirring for 2 minutes in a Waring blender. The formulation was then blended with 5 parts of antimony trioxide, 10 parts of titanium dioxide and suitable stabilizers as in Example 22 by rolling on a hot rubber mill and the composition was then injection molded into test specimens measuring 5 inches by one-half inch by one-eighth inch. Physical test results are shown in Table IV.

EXAMPLE 27

In the same manner as shown in Example 26 commercial samples of acrylonitrile-butadiene-styrene polymer designated hereafter ABS prepared by emulsion polymerization and tradenamed Blendex 101 were blended with the polyester of Example 3, and the compositions were compounded with 10 parts titanium dioxide and 5 parts antimony trioxide and stabilizers as in Example 26 and rolled on a hot rubber mill and injection molded as described above.

EXAMPLE 28

In the same manner as described in Example 26, a commercial ABS polymer designated Cyclolac TD was blended with the polyester of Example 3, in the same proportion as described above and compounded in the same proportions as described above with the titanium dioxide and antimony trioxide and suitable stabilizers. The composition was combined on a hot rubber mill and injection molded. Physical test results are reported in Table IV.

TABLE IV

| Example No. | Heat Distortion (°C) | Flexural Yield (psi) | Tensile Strength Yield psi | Notched Izod Impact Strength ft.lb/in. of Notch |
|---|---|---|---|---|
| 22 | 73 | 9607 | 5690 | 4.4 |
| 26 | 73 | 11,500 | 6200 | 1.8 |
| 27 | 71 | 9,400 | 5470 | 0.8 |
| 28 | 74 | 10,860 | 6630 | 0.6 |

The data of the above table show that when the polymers of the invention are compounded with the polyester resin of Example 3, the impact strength though reduced as compared to the uncompounded polymer (Example 1) is substantially higher (Example 22) as compared to a similarly compounded polymer of the same polymer composition made by an emulsion polymerization method (Example 26) or as compared to samples of prior art polymers (Examples 27 & 28).

In the foregoing examples, the following test procedures were employed. ASTM refers to American Society for Testing Materials

| | |
|---|---|
| Heat Distortion Point | ASTM D648–56 |
| Impact Strength | ASTM D256–56, Method A |
| Flexural Strength, Flexural Yield Strength and Flexural modulus | ASTM D790–16, as modified by using ⅛ inch by ½ inch by 5 inch test bar |
| Tensile Strength and Elongation | ASTM D–638–61, as modified by using ⅛ inch by ½ inch by 5 inch test bar machines so that dimension C is 0.500 inch, dimension W is 0.1875 inch, and dimension F is 1.500 inch. |
| Flame Retardance | ASTM D635–56 Underwriters Labroatories UL-94 |

While the invention has been described with reference to certain specific embodiments, it will be recognized by those skilled in the art that many variations are possible without departing from the spirit and scope of the invention.

What is claimed is:

1. A polymer composition comprising
   a. a graft copolymer consisting of a butadiene polymer and a polymerizable monomer as polymerizable components, said graft copolymer having aliphatic carbon-to-carbon unsaturation, high impact strength, high tensile strength and an insoluble gel content of about 10 to 40 percent by weight in tetrahydrofuran, produced by providing an aqueous emulsion of said butadiene polymer and a polymerizable monomer having aliphatic carbon-to-carbon unsaturaton, converting said aqueous emulsion to an aqueous suspension, and thereafter reacting said polymerizable components to produce said graft copolymer, wherein said polymerizable monomer is in a proportion of about 50 to about 90 weight percent based on the total weight of said polymerizable components, said graft copolymer present in the proportion of from about 10 to aout 90 weight percent based on the total weight of the polymer composition; in admixture with b. a polyester of a polycarboxylic compound and a polyhydric alcohol comprising a maximum of 5 mole percent of carboxylic or hydric component that contains polymerizable aliphatic carbon-to-carbon unsaturation.

2. The polymer composition of claim 1 wherein said polyester is a halogen-containing or phosphorus-containing polyester.

3. The polymer composition of claim 1 wherein the polycarboxylic compound is an adduct of a hexahalocyclopentadiene and a dicarboxylic compound containing aliphatic carbon-to-carbon unsaturation.

4. The polymer composition of claim 1 wherein the polycarboxylic compound is selected from the group consisting of chlorendic acid and chlorendic anhydride, wherein said polyester comprises 10 to 50 weight percent of said polymer composition and has a molecular weight of at least about 1,000, and wherein said graft copolymer comprises a graft copolymer of polybutadiene, styrene and acrylonitrile.

* * * * *

PO-1050
(5/69)

UNITED STATES PATENT OFFICE
CERTIFICATE OF CORRECTION

Patent No. 3,758,640      Dated September 11, 1973

Inventor(s) Donald H. Thorpe

It is certified that error appears in the above-identified patent and that said Letters Patent are hereby corrected as shown below:

Column 6, line 24, after "polycarboxylic" insert --compounds--. Columns 13 and 14, Table II, line 41, "tetrahydrophthic" should read --tetrahydrophthalic--; line 42, after "Anhydride;" insert --FA = Fumaric Acid; MA = Maleic Anhydride;--. Column 15, line 58 "A blent" should read --A blend--. Column 16, line 47,, "D790-16" should read --D790-61--. Column 17, line 12 "aout" should read --about--.

Signed and sealed this 4th day of June 1974.

(SEAL)
Attest:

EDWARD M. FLETCHER, JR.
Attesting Officer

C. MARSHALL DANN
Commissioner of Patents